United States Patent [19]
Gehman et al.

[11] 3,750,167
[45] July 31, 1973

[54] POSTAL TRACKING SYSTEM

[75] Inventors: John B. Gehman; Gilbert A. Herlich; Seigfried Mikuteit, all of San Diego, Calif.

[73] Assignee: General Dynamics, San Diego, Calif.

[22] Filed: July 22, 1971

[21] Appl. No.: 165,241

[52] U.S. Cl............ 343/6.5 SS, 343/6.8 R, 343/7 A
[51] Int. Cl................................................ G01s 9/56
[58] Field of Search ...................... 343/6.5 R, 6.8 R, 343/6.5 SS

[56] References Cited
UNITED STATES PATENTS
| | | | |
|---|---|---|---|
| 3,373,425 | 3/1968 | Barischoff | 343/6.8 R |
| 3,706,094 | 12/1972 | Cole et al. | 343/6.5 SS |
| 3,713,102 | 1/1973 | Martin | 343/6.5 SS |

*Primary Examiner*—T. H. Tubbesing
*Attorney*—Martin Lukaucher

[57] ABSTRACT

A system for tracking mail bags, letters, and parcels through a post office to determine mail processing times accurately as well as processing delays is disclosed. An unobtrusive transponder in the form of a card is located in letters or mail bags to be tracked. A number of stations are located along the route of the mail bags and irradiate these bags. Each station includes an array of three antennas disposed in mutually orthogonal relationship so as to irradiate the transponder notwithstanding its position. When irradiated by ultra high frequency (UHF) energy, the transponder is activated and transmits a VHF signal. The transponder includes a transmitting circuit which may be selectively set to transmit a signal having a frequency uniquely identifying the transponder. The system includes a receiver for tracking a plurality of transponders and providing an output as to when and if the transponder is tracked as it passes through each station along the mail route.

28 Claims, 14 Drawing Figures

INVENTORS.
JOHN B. GEHMAN
GILBERT A. HERLICH
AND SIEGFRIED MIKUTEIT

BY

ATTORNEY

INVENTORS.
JOHN B. GEHMAN
GILBERT A. HERLICH
AND SIEGFRIED MIKUTEIT

BY

ATTORNEY

POSTAL TRACKING SYSTEM

The present invention relates to tracking systems with inconspicuous transponders and more particularly to a system for tracking mail, such as letters, parcels and mail bags.

The invention is especially adapted for use in tracking mail such as letters and mail bags through a post office to determine processing delays; features of the invention will however be found generally applicable for tracking and locating various objects particularly where it is desired that there be no visible identification of the presence of a tracking device.

The rapid handling of mail necessitates the determination of processing times and delays. In the past the practice has been for postal inspectors to conspicuously mark a mail bag as it enters the post office and then walk along with the mail bag through the route which the bag takes so as to determine if, where and when delay occurs. Oftentimes it is important to determine how a particular letter addressed to a particular delivery point is processed in a post office. Tracking of such letters provides serious problems since it is difficult to conspicuously mark such letters and moreover the letter is relatively small such that it can be easily lost from the sight of the postal inspector as he walks with the letter along the mail route. It will be appreciated of course, that the amount of time and effort required to track a large number of letters or mail bags is extensive. Moreover, the presence of conspicuous markings and the presence of the postal inspector himself militate against the confidence of postal employees which the result of the aforedescribed tracking process produces.

The prior art has various electronic systems of tracking (see U.S. Pat. Nos. 3,253,588; 3,373,425; 3,438,489; and 3,511,372). These systems however do not provide many of the features necessary for reliable tracking of mail and other postal material through a post office, as for example by requiring conspicuous device, capability of tracking a multiplicity of items of mail simultaneously, and lack of sensitivity to the location of the tracking device, as for example by being insensitive to the position of the item of mail which may be located at random in any position as it travels along the mail route.

Accordingly, it is an object of the present invention to provide an improved tracking system.

It is a further object of the present invention to provide an improved system for tracking mail and other postal materials.

It is a still further object of the present invention to provide an improved system for tracking mail bags, letters, and other postal materials through a post office for determining processing delays and otherwise to facilitate mail handling wherein the foregoing difficulties and disadvantages of prior systems and techniques have been substantially eliminated.

It is a still further object of the present invention to provide an improved passive transponder device which may readily be programmed to provide tracking signals uniquely identifying the transponder.

Briefly described a tracking system embodying the invention includes a passive trandponder transponder a receiving antenna lying in a plane, as by being deposited on the surface of a card which may readily be mailed in a letter addressed to a desired delivery point. The card also contains a transmitter for transmitting signals uniquely identifying the card when activated by radiation received by the receiving antenna.

The system includes a transmitting antenna array located at each of one or more stations along the route where tracking is desirable to take place. The antenna array radiates signals in three planes orthogonal to each other to provide a radiation pattern which will irradiate the receiving antenna notwithstanding that it may be randomly located in any position. This system also includes receiving devices for receiving signals transmitted from a plurality of transponders so as to track the transponders by responding to the signals transmitted thereby when such transponders are activated and located at the various stations of the transmitting antenna arrays.

The foregoing objects and advantages of the invention as well as other objects and advantages and features thereof will become more readily apparent from a reading of the following description in connection with the accompanying drawings in which:

Figures 1, 2:
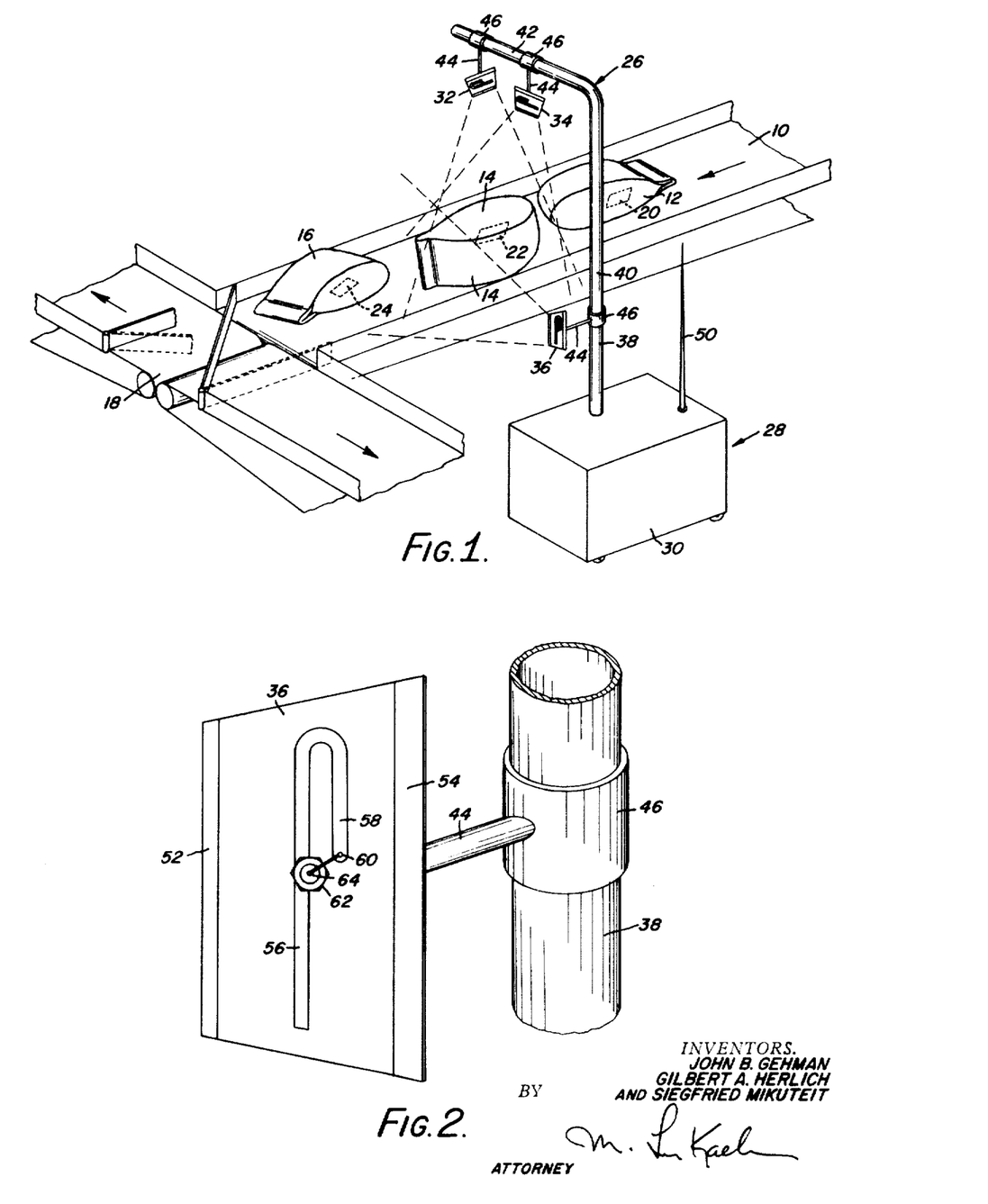
FIG. 1 is a perspective view of a mail handling system in connection with which the tracking system provided by the invention is utilized.
FIG. 2 is an enlarged perspective veiw of one of the transmitting antennas of the system shown in FIG. 1.

Referring to FIG. 1, there is shown a conveyor 10 on which mail bags 12, 14 and 16 are carried as in a post office. It may be desired to determine how mail is delayed at a crossover point 18 of the conveyor belts 10. To this end the mail bags are provided with passive transponders 20, 22 and 24 (shown in the dash lines) contained in envelopes in the mail bag 12, 14, and 16.

These transponders take the form of cards, specifically printed circuit cards. They may have suitable dimensions 2¾" wide by 6½" long by 0.031 inch thick. The cards are placed in ordinary envelopes and addressed to desired delivery points. There are no marks on the envelopes whatsoever indicating their contents. The tracking devices are therefore inconspicuous and mail handling personnel will handle the envelopes containing the cards in the same manner as ordinary mail. Thus the cards will find their way into the appropriate mail bag or out of mail bags only in accordance with the address on the envelope. The tracking information obtained from the cards by the system therefore may confidently be regarded as accurately representing the progress of the mail through the post office, and any processing delays which are incurred.

Each card has a receiving antenna printed on at least one surface thereof. The antennas therefore lie in the plane of the card. The cards themselves in the mail bags in which they are contained may find themselves in any position on the conveyor. The cards 20, 22, and 24 are therefore representatively shown as being disposed in different positions. The disposition of the receiving antennas will become more apparent as the description of the transponders themselves proceeds hereinafter particularly with reference to FIGS. 3 through 6, 10, and 11. Desirably the receiving section of the transponders is adapted to respond to ultra high frequency (UHF) radiation such as a frequency of about 900 MHz. These UHF frequencies are desirable since the receiving antenna on the card is an efficient half-wave structure at UHF frequencies, which is of a size to fit into an ordinary envelope.

Radiation which is polarized in the plane of the receiving antenna will be picked up by the transponders and used for providing power to operate the transmitter portion of the transponders, as will be discussed more fully hereinafter. Inasmuch as the radiation which is provided will be polarized in three planes, it is assured that sufficient radiation will be present in any plane in which the receiving antennas of the cards may find themselves.

Thus, at each station at which the transponders are interrogated, there is provided an antenna array 26, as part of the station 28 which illuminates the interrogation region at the station in three mutuilly orthogonal polarization planes of UHF radiation. The station includes, in this illustrative embodiment, a transmitter and a receiver both contained in a portable housing. The transmitter provides operating power, say 5 to 10 watts of UHF power at 900 MHz, to three antennas 32, 34, and 36. These antennas are mounted on a mast 38 having a vertical portion 40 and a horizontal portion 42 which is positioned over the conveyor belt 10. Each of the antennas 32, 34, and 36 is in the form of a printed circuit card. The antenna 32 is disposed so that the plane of its card is parallel to the conveyor belt. The card of the antenna 34 is perpendicular to the belt. The card of the antenna 36 is also perpendicular to the belt, but is disposed in a vertical plane. In other words, the planes of the card 32, 34, and 36 are mutually perpendicular. The card 36 has its plane lying on a vertical or Z-axis while the planes of the cards 32 and 34 which are attached to the horizontal portion 42 of the mast 38 lie along the X- and Y-axis respectively. Thus the three antennas 32, 34, and 36 provide a pattern of radiation which is linearly polarized along all three axes and thus can fully illuminate the receiving antennas of the transponders 20, 22, and 24 as they pass through the station, irrespective of the random orientation of the transponder cards 20, 22 or 24. Each of the antenna cards is connected by an arm 44 to a collar 46. The collars 46 are adjustable along the mast so that the pattern of radiation can be adjusted to illuminate various configurations of interrogation regions which can be provided at the stations, for example various widths of conveyor belts.

The housing 30, as noted above, also contains the receiving portion of the tracking system. This receiving portion is connected to an omnidirectional antenna 50, illustrated as a whip antenna. In this illustrative embodiment of the invention the transponder cards 20, 22 and 24 transmit in the VHF band, say at any frequency between 60 MHz and 70 MHz. In the receiving mode the antenna 50 receives the VHF transmissions from the transponders. The receiver translates them into outputs which represents the different transponder cards. Thus, each transponder card can be coded frequency-wise in accordance with the delivery point of the envelopes containing the cards, and the information as to when and whether or not particular cards pass through particular stations, such as the station 28, may be derived by the receiving system which is responsive to the signals received on the antenna 50.

The antenna 36 is shown in greater detail in FIG. 2. It is a printed circuit card. The left edge of the card (as viewed in FIG. 2) is disposed closest the conveyor 10 as shown in FIG. 1. Conductive strips 52 and 54 are printed along the left and right edges of the card respectively. The conductive strip 52 serves as director element, while the conductive strip 54 serves as a reflector element of the antenna. The radiating element of the antenna is a folded conductive strip having two parallel sections 56 and 58 which are interconnected at their upper ends. The free end of the strip 58 extends approximately mid-way of the other strip 56 and provides a feed point 60, thereby effectively providing half of a folded dipole. A coaxial connector 62 is provided through which UHF power is coupled to the antenna. The central conductor 64 of the coaxial connector is connected to the feed point 60. The outer or grounded shell of the connector 62 is connected to the mid-point of the longer conductive strip 56. The antenna thereby provides a directive radiating device which radiates linearly polarized UHF energy. The polarization being the plane of the card on which the conductive elements of the antenna are printed.

Figure 3:
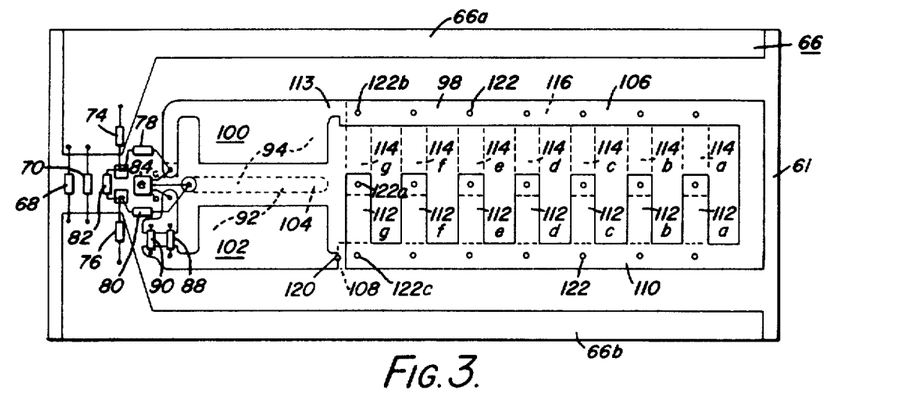
FIG. 3 is a top view of a passive transponder provided in accordance with the invention which may be used in the system shown in FIG. 1.
Figure 4:
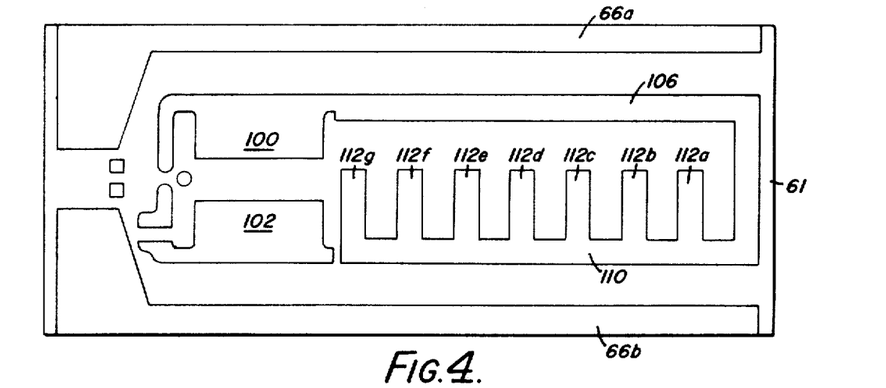
FIG. 4 is a top view of the transponder shown in FIG. 3; but with circuit components and dash lines removed.
Figure 5:
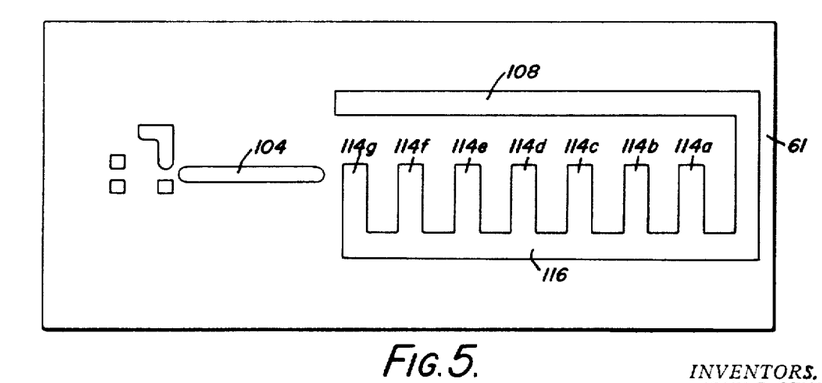
FIG. 5 is a bottom view of the transponder shown in FIG. 3.
Figure 6:
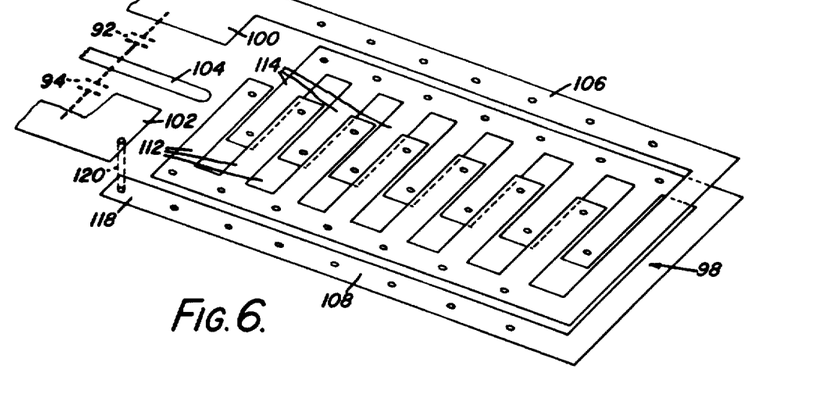
FIG. 6 is a diagrammatic, perspective view of an inductor element of the transmitting circuit of the transponder shown in FIG. 3.

Referring to FIGS. 3 through 7, there is shown a passive transponder which may be placed in an envelope and used as a transponder in the mail bags 12, 14, and 16. The transponder is a printed circuit card 61 wherein the principal component of the transponder, viz., antennas, coils, and capacitors, are formed by the insulating material of the card and the conductive members which are printed thereon. The card itself may be conventional epoxy-glass, copper cladded on both sides. The cladding is removed by a selective etching process in accordance with normal printed circuit manufacturing techniques to provide the conductive areas shown in the drawings. Specifically FIG. 3 shows the top of the card; the conductive areas on the bottom of the card being in dash lines. These bottom conductive areas are shown in FIG. 5 which is the bottom view of the card. FIG. 4 shows the conductive areas on the top of the card, but with the dash lines and circuit elements of the transponder as shown in FIG. 3 removed.

Figure 7:
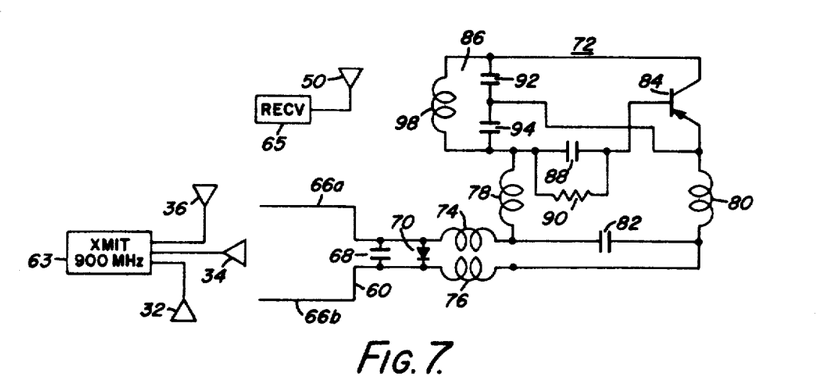
FIG. 7 is a schematic diagram showing the circuit of the transponder shown in FIG. 3 together with other elements of the tracking system shown in FIG. 1.

The electrical circuity of the transponder is shown in FIG. 7. The transponder, as was mentioned above in FIG.1 operates together with the transmitter and receiver of the tracking station 28. The transmitter 63 is shown as providing a 900 MHz signal to the antennas 32, 34, and 36 of the transmitting array. The receiving antenna 50 is connected to the receiver of the tracking station.

The transponder includes receiver and transmitter circuits. The receiver circuit contains the receiving antenna 66 which has two elements 66a and 66b providing a dipole. The antenna 66 is connected to a detector circuit including a capacitor 68 and a diode 70 connected between the dipole elements 66a and 66b. When the antenna 66 is irradiated by the array, approximately half of 1 volt of DC voltage and sufficient current is developed to operate the oscillator circuit 72 which affords the transmitter circuit of the transponder. Inasmuch as this oscillator circuit operates at approximately 60 MHz, a filter arrangement including chokes 74, 76, 78, and 80, and a capacitor 82 is connected between the detector of the receiver and the transmitter oscillator circuit 72, to prevent VHF signals from entering the detector and receiving antenna.

The oscillator circuit itself is a Colpitts oscillator including a transistor 84 and a tank circuit 86. The base of the transistor 84 is connected to one end of the tank circuit by coupling capacitor 88 which is shunted by a resistor 90. The other end of the tank circuit is connected to the collector of the transistor and feed back is provided to the emitter of the transistor from the junction between the capacitors 92 and 94 of the tank circuit. The inductor element 98 or coil of the tank circuit also serves as the transmitting antenna.

Referring to FIG. 3 the elements of the transponder circuit are designated in FIG. 3 by the same reference numerals as shown in FIG. 7. The antenna 66 is provided by the two quarter wavelength elements 66a and 66b which extend along the edges of the top surface of the card and are printed strips. This wavelength is measured at 900 MHz. UHF radiation then develops a voltage across the capacitor 68 which is rectified by the diode 70 and is coupled via the chokes 74, 78, 76 and 80 to the oscillator circuit.

The capacitors 92 and 94 of the oscillator circuit are provided by conductors which are printed on the top and bottom surfaces of the card. Two of these conductors are plates 100 and 102 on the top surface of the card which are spaced from each other so as to form a gap therebetween. A conductive strip 104 on the bottom surface of the card is disposed in this gap. The dielectric material of the card itself provides the dielectric for the capacitors 92 an 94 which are formed between the plates 100 and 102 and the strip 104.

The inductor 98 is provided by a pair of loops 106 and 108 which are located on the top and bottom surfaces of the card respectively by being printed thereon. These loops 106 and 108 overlie each other. The side 110 of the top loop has seven fingers 112 extending therefrom toward the center of the card and overlie the central region of the card. While seven fingers 112a to 112g are shown in the drawing more or fewer fingers may be provided depending upon the number of frequencies which are desired to be selected for transmission. Similarly the loop 108 on the bottom of the card has fingers 114 extending from the side 116 thereof which is opposite to the side 110 of the upper loop 106. These fingers 114 also extend toward the center of the card and have their free ends underlying the free ends of the fingers 112.

Connection between the upper loop and the plate 100 of the capacitor are provided by the printed conductor 113 therebetween. Connection between the bottom loop 118 and the plate 102 is provided by a connector 120 which extends through the card between a projection from the plate 102 to the side 118 (see FIG. 6).

Holes 122 through the card are located along extensions of the fingers into the side of the loops 106 and 108 and between the overlying free ends of the fingers 112 and 114. Connections may be selectively made betwen the free ends of the fingers and between the loops by way of these holes. For example rivets or screws may be brought through these holes 122. By virtue of the disposition of the loops and fingers, an automated machine may be used to attach the screws and/or rivets to provide selected frequencies for individual cards. It will be observed that by providing connection via the holes 122 between the various fingers 112 through 114, the length of the coil provided by the loops 106 and 108 and therefore the inductance of the inductive element 98 may be varied so as to vary the frequency of the oscillator selectively in steps.

By way of example the inductor 98 will have its highest inductance and the oscillator will be at its lowest frequency when a connection is made through a hole 122a between the fingers 112g and 114g where these fingers overlap each other. The highest frequency is obtained by providing, in addition to a connection to the hole 122a, further connections through holes 122b and c. This effectively short circuits the majority of the coil, leaving a short coil section connected across the plates 100 and 102 of the capacitor. It will be apparent that various lengths of the coil provided by the loops 106 and 108 as well as various lengths of short circuited coil sections may be provided by selectively inserting connectors into the holes 122.

Figure 8:
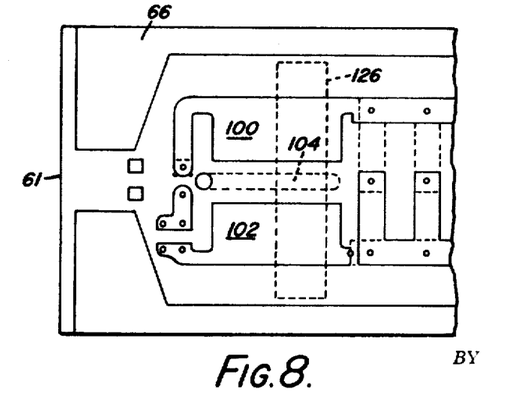
FIG. 8 is a fragmentary plan view showing a portion of the transponder shown in FIG. 3 together with means for varying the capacitance of the capacitor element of the transmitter circuit thereof.
Figure 9:
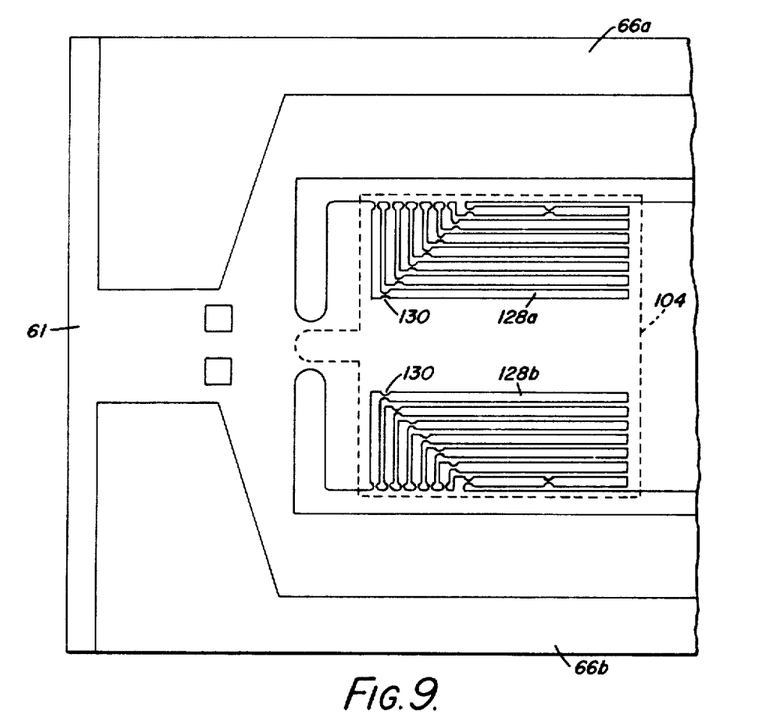
FIG. 9 is a fragmentary plan view similar to FIG. 8 showing means of varying the capacitance of the capacitive element in accordance with another embodiment of the invention.

In order to provide additional frequencies between the discrete frequencies afforded by making connections through the holes 122, the capacitors 92 and 94 may have their capacitance varied by the means shown in FIG. 8 or FIG. 9. In FIG. 8 a strip of conductive tape 126 which is in contact with the central conductor 104 of the capacitor at bottom of the card extends transversely across the region on the bottom surface underlying the plates 100 and 102. This effectively provides greater plate area for the bottom plate provided by the conductor 104 thereby increasing the capacitance depending upon the area of the conductive strip or tape 126.

In FIG. 9 the bottom plate 104 underlies a plurality of L-shaped members 128a and 128b which lie in nested relationship over the plate 104. Each of these L-shaped members 128a and 128b has a neck region 130 along the leg of the L-shaped members which extends parallel to the edge of the card 61. By opening the conductive path provided in these L-shaped segments, the capacitance of the capacitors 92 and 94 which are respectively provided between the plates 128a and 104 and the plate 128b and the plate 104 may be varied in discrete steps. Desirably correspondingly disposed L-shaped members 128a and 128b are both disconnected so that the capacitors 92 and 94 will have the same value of capacitance. It is therefore observed that the transmitted frequency produced by the transponder can be varied in a large number of steps or to have a large number of frequencies which are then transmitted when the transponder is activated, as by being irradiated by UHF energy produced by the antennas 32, 34, and 36.

Figure 10:
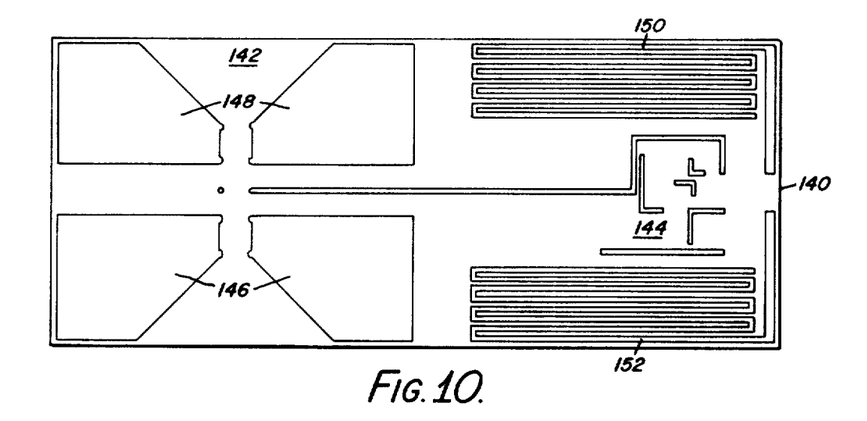
FIG. 10 is a plan view of a passive transponder in accordance with another embodiment of the invention wherein the circuit elements of the transponder have been removed for clarity of the illustration.

FIG. 10 illustrates another embodiment of the transponder. In FIG. 10, a printed circuit card 140 is printed only on one side, and the receiving circuits 142 are located on the left side of the card while the transmitting circuit 144 is located on the right side of the card as viewed in FIG. 10. The components of the receiving and transmitting circuits are not shown in FIG. 10 or in FIG. 11 so as to facilitate the illustration. The circuitry will be apparent hereinafter in connection with FIG. 12.

In FIG. 10 the receiving circuit includes a pair of dipole receiving antennas 146 and 148. The detector circuits are connected across both of these dipole receiving antennas 146 and 148 and provides operating power to an oscillator which forms the transmitter circuit 144. This oscillator may be crystal controlled. Accordingly, the frequency of the transmitted signals may be selected by selecting the frequency of the crystal. The transmitting antennas are provided by a pair of serpentine elements 150 and 152 which may be connected to the coil in the tank circuit of the oscillator and function essentially as short wire antennas.

Figure 11:
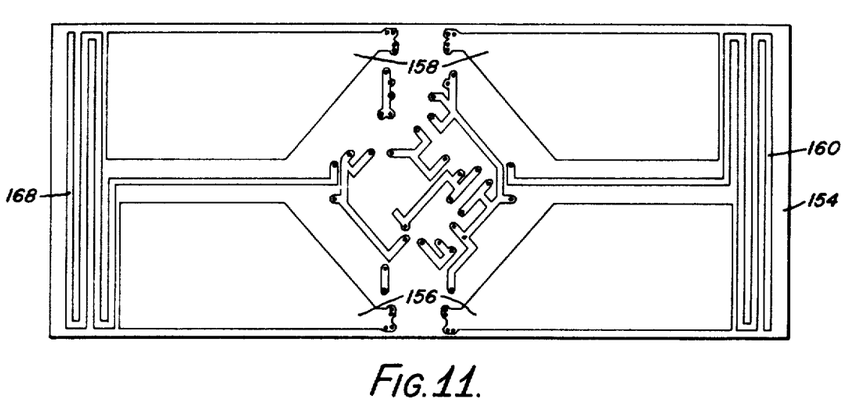
FIG. 11 is another plan view similar to FIG. 10 of another passive transponder in accordance with still another embodiment of the invention.

In FIG. 11, the receiving circuit and the transmitting circuits have their discrete elements disposed in the central region of a printed circuit card 154. The receiving antennas are provided by a pair of dipoles 156 and 158. Dual detector circuits similar to the detector circuit including the capacitor 68 and diode 70 (FIG. 7) may be provided. DC power from the detector circuits is applied to a crystal controlled oscillator; the selection of the crystal determining the frequency to be transmitted. The output of the oscillator is connected to a transmitting antenna provided by the serpentine printed wires 160 and 168 along the opposite narrow edges of the card 154.

Figure 12:
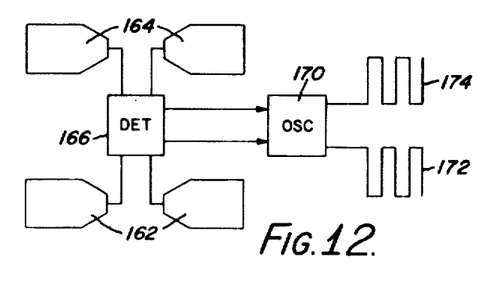
FIG. 12 is a schematic diagram of the circuitry of the transponders shown in FIGS. 10 and 11.

FIG. 12 illustrates a pair of receiving antennas 162 and 164 which correspond either to the antennas 146 and 148 or the antennas 156 and 158. The radiation picked up by these antennas is detected in the detector circuit 166 of the receiver portion of the transponder and converted into DC power which energizes an oscillator 170. The oscillator is then connected to a pair of short wire antennas 172 and 174 which respectively corresponds to either the antennas 150 and 152 or the antennas 160 and 168, shown in FIGS. 10 and 11. As noted above these antennas may be connected to the tank circuits of the oscillator; the oscillators may also be Colpitts oscillators similar in circuit to the oscillator circuits 72 shown in FIG. 7. However the oscillator 170 is desirably crystal controlled, as by having a crystal connected between the emitter and the junction of the tank circuit capacitors.

As will be apparent from the relative sizes of the antennas in the receiver and transmitter circuits of the transponders shown in FIGS. 10 and 11, it is preferable to operate the receiver circuits in the UHF band and the transmitter circuits in the VHF band. Any number of VHF signals may readily be selected by choosing the frequency of the crystal.

Figure 13:
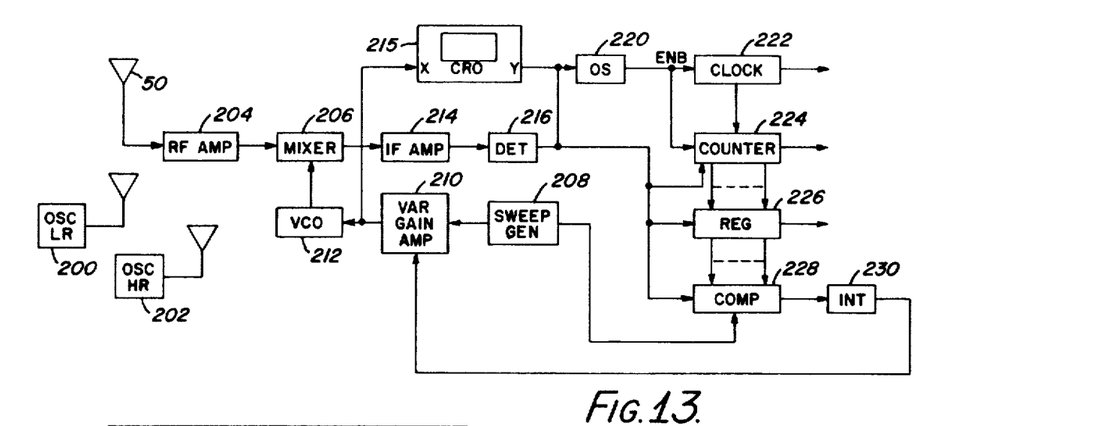
FIG. 13 is a block diagram of a receiving system which may be used in the tracking system shown in FIG. 1.

The receiving system for indicating which of the transponders pass through the station is shown in FIG. 13. It is desirable that this receiving system be used with transponders which are not crystal controlled. In this receiving system it is desirable also to have as part of the station, two additional oscillators 200 and 202 indicated in the drawing as a low reference (LR) and a high reference (HR) oscillator. These oscillators will be exposed to the same environment as the transponders. Accordingly, their frequency and other characteristics will be subjected to the same environmental effects, such as temperature. In the operation of the circuits of the receiving system, the low reference and high reference signals from these oscillators 200 and 202 then provide accurate frequency which may be used to reference the transmitted frequency from the transponders. Inasmuch as all of these frequencies drift together, the output indication, when referenced to the reference frequencies from the oscillators 200 and 202 provide an accurate measure of the proper transponder signal frequencies.

The signals from the transponders as well as the low reference and high reference oscillators 200 and 202, are picked up by the receiving antenna 50 and amplified in a broadband RF amplifier 204 which covers the entire VHF band (say from 60 to 70 MHz), in which the transponder transmitted frequencies exist. A frequency translator in the form of a mixer 206 is provided by an injection frequency which sweeps the band, in much the same manner as a panoramic receiver so as to provide outputs from the mixer whenever a low reference, high reference, or a transmitted signal from the transponder exist in the band during a sweep. This sweep voltage may be provided by a VHF sweep generator 208. The output of the sweep generator 208 is controlled by variable gain amplifier 210 which operates a voltage controlled oscillator 212. This voltage controlled oscillator (VCO) may be an oscillator having a varactor diode which provides a capacitance in the oscillator which varies in accordance with the DC sweep voltage from the sweep generator as controlled by the variable gain amplifier 210. The output of the mixer is an IF signal at a frequency corresponding to the transmitted frequency.

Figure 13A:
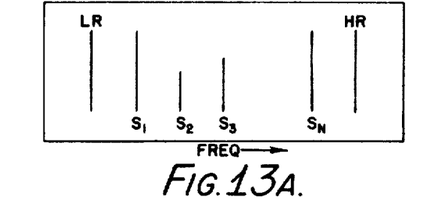
FIG. 13A depicts a representative oscilloscope display produced by the system shown in FIG. 13.

In the event there are no transmitted frequencies from transponders passing through the station during a particular sweep then only the low reference and high reference signals will be produced during that sweep. However if there is a transmitted signal an RF signal will be produced at a short-time interval after sweeping the low reference signal. This time interval corresponds to the difference in frequency between the transmitted signal and the low reference signal. Accordingly, if the output of the sweep generator is connected to the horizontal deflection plates or X-axis of an oscilloscope (CRO), and the output signal from the receiver, after amplification in an intermediate frequency amplifier 214 and detection in a detector 216 is applied to vertical deflection plates or Y-axis inputs of the CRO 215, a display similar to that shown in FIG. 13a will be produced. This display is similar to that of a spectrum analyzer. The screen of the CRO on which the display is produced may be calibrated in terms of the transponders which are expected to pass through the station and these signals or their corresponding transponders are illustrated in FIG. 13a, as $S_1$, $S_2$, $S_3$, and $S_n$, so as to illustrate a case where several transponders pass through the station on a single sweep. In addition, the output of the sweep generator may be used to excite a time clock which will print out the time of each sweep. By correlating the time of a sweep with the output produced by the CRO, the time when various transponders pass through the station may be obtained. In lieu of a CRO 215, an oscillograph printer may be used in connection with a time of the day clock output. Accordingly, the time of day and the transponder signal output may be recorded on the same oscillograph strip.

A digital readout of the transponder signals may also be provided and to this end there is provided a one shot oscillator 220 which enables a clock 222 upon the first output from the detector. This output will correspond to the lower reference from the oscillator 200. At the start of each sweep, as the low frequency reference is detected, the clock is enabled. The output of the clock is counted in a digital counter 224. Desirably this counter is reset when the lower reference output first triggers the one shot 220. Upon receipt of subsequent outputs the counter is read out into a register 226 and the register is read out as to a printer which prints a numeral corresponding to the frequency of the transponder passing through the station concurrently with the sweep.

To compensate for drift the sweep generator 208, at the end of the sweep, enables a comparator 228 to compare a preset number (count) with the number (count) read out of the register into the comparator. The comparator output is an error voltage which is integrated in an integrator 230 and controls the variable gain amplifier to adjust the sweep frequency rate to compensate for transponder oscillator drift.

From the foregoing description it will be apparent that there has been provided an improved tracking system as well as improved transponders for use therein. Variations and modifications within the scope of the invention will become apparent to those skilled in the art. Accordingly, the foregoing description should be taken as illustrative and not in any limiting sense.

What is claimed is:

1. A tracking system comprising
   a. a passive transponder having
      1. a receiving antenna lying in a plane and responsive principally to radiation polarized in said plane, and
      2. means for transmitting signals when activated by the radiation received by said antenna,
   b. means for activating said transponder when it is located in a region including a transmitting antenna array for radiating signals in three planes orthogonal to each other to provide a radiation pattern in said region in said receiving antenna plane, and
   c. means for receiving signals transmitted from said transponder so as to track said transponder when it is located in said region.

2. The invention as set forth in claim 1 wherein said passive transponder includes a card which defines the plane in which said receiving antenna lies.

3. The invention as set forth in claim 2 wherein said antenna is a body of conductive material on a portion of said card.

4. The invention as set forth in claim 1 wherein said transponder includes a detector circuit coupled to said receiving antenna for providing operating power when said receiving antenna is irradiated by said transmitting antenna signals in the UHF band, and wherein said transmitting means includes an oscillator operative in the VHF band when activated by said operating power.

5. The invention as set forth in claim 4 wherein receiving antenna includes a plurality of dipole elements on the surface of a card, both of which are connected to said detector.

6. The invention as set forth in claim 5 wherein said oscillator includes a plurality of coils on the surface of said card, said coils being connected to said oscillator.

7. The invention as set forth in claim 4 wherein said oscillator includes a tank circuit having a coil on the surfaces of a card, which coil provides a transmitting antenna for said transponder.

8. The invention as set forth in claim 7 wherein said coil includes a pair of sections each on an opposite surface of said card, and means extending through said card and intersecting said sections of said coil for selectively changing the inductance of said coil and thereby the frequency of the signal transmitted by said oscillator.

9. The invention as set forth in claim 1 wherein said transmitting antenna array includes three transmitting antennas spaced from each other along the perimeter of said region.

10. The invention as set forth in claim 9 wherein each of said transmitting antennas comprises a card having a radiating element disposed in the plane of said card and parallel to an edge thereof.

11. The invention as set forth in claim 10 wherein each of said cards is disposed in different ones of three mutually perpendicular planes.

12. The invention as set forth in claim 11 comprising a mast on which said cards are mounted.

13. The invention as set forth in claim 12 wherein said mast has a vertical section and a horizontal section respectively disposed on adjacent sides of said region, at least two of said cards being mounted on one of said sections.

14. The invention as set forth in claim 14 wherein said two cards are mounted on said horizontal section.

15. The invention aS set forth in claim 10 wherein said card has a director element along one edge thereof and a reflector element on the opposite edge thereof, said radiating element being disposed between said edges and parallel thereto.

16. The invention as set forth in claim 15 wherein said radiating element has first and second parallel branches spaced from each other and connected together at one end, said first of said branches having a free end terminating a distance from the end thereof which is connected to said second branch about at the mid-point of said second branch, a coaxial feed through connector having a center conductor connected to the free end of said first branch and an outer conductor connected to the mid-point of said second branch.

17. A passive transponder comprising
   a. a card of insulating material,
   b. a receiving circuit for translating radiation into operating power mounted on said card, said receiving circuit including a receiving antenna disposed on a surface of said card, and
   c. an oscillator circuit also mounted on said card and having said operating power coupled thereto, said oscillator circuit including a tank circuit having capacitor and inductor elements, said inductor element including first and second branches disposed on opposite surfaces of said card, said capacitor including a plurality of plates disposed on said opposite surfaces of said card, said card providing the dielectric of said capacitor, and openings for conductive members, said openings extending through said card between said branches for changing the inductance of said inductor element.

18. The invention as set forth in claim 17 wherein said inductor element provides a transmitting antenna for said transponder.

19. The invention as set forth in claim 18 wherein said capacitor element includes a pair of top plates on a first surface of said card, said plates being spaced from each other to provide a gap therebetween, and a bottom plate disposed on a second surface of said card in the region opposite to said gap whereby to provide first and second capacitors respectively between the first of said pair of top plates and said bottom plate and between the second of said pair of top plates and said bottom plate.

20. The invention as set forth in claim 19 wherein said plates are printed upon said surfaces of said card.

21. The invention as set forth in claim 20 including a conductive member disposed on said second surface of said card in contact with said bottom plate and extending transversely across the region of said second surface opposite to said first and second plates whereby to vary the capacitance of said capacitor elements.

22. The invention as set forth in claim 18 wherein said branches are each loops which overlie each other, a first on the top and a second on the bottom surface of said card, a plurality of spaced fingers extending in opposite direction from opposite sides of said top surface and bottom surface loops each toward the center of said card on their respective surfaces and overlying each other at the center of said card, and means for selectively interconnecting said fingers and said loops where they overlie each other for selectively changing the inductance of said inductor element and the frequency of said oscillator.

23. The invention as set forth in claim 22 wherein said loops are printed on said top and bottom surfaces.

24. The invention as set forth in claim 18 wherein said capacitor elements include a plate on the bottom surface of said card, and a pair of plates on the top surface of said card, said pair of top plates each including a conductor located along an edge of said bottom plate and spaced therefrom, and a plurality of L-shaped fingers disposed in nested relationship and extending from said conductor into a region of said card overlying said bottom plate, and means for disconnecting the free legs of each of said L-shaped members from the leg thereof extending to said conductor whereby to vary the capacitance of said elements and thereby change the frequency of said oscillator.

25. In a tracking system operative for tracking a plurality of transponders which transmit signals at different frequencies in a band, a receiving system for simultaneously tracking said transponders at successive time intervals, said receiving system comprising means for transmitting a high and a low reference signals having frequencies at opposite ends of said band, a receiver including a frequency translator for receiving said reference signals and said transponder signals and mixing therewith an injection signal to provide an output, means for sweeping said injection signal in frequency at said successive time intervals so as to provide said outputs whenever a transponder or reference signal is received during each of the sweeps, and means responsive to said output for indicating the reception of said signals during each of said sweeps.

26. The invention as set forth in claim 25 wherein said indicating means is a oscilloscope.

27. The invention as set forth in claim 25 wherein said indicating means comprises a clock pulse source, a counter for counting clock Pulses from said source, means for enabling the application of said clock pulses to said counter when said output corresponds to said low reference, and means for reading out said counter when said output corresponds to said transponder and high reference signals to indicate the presence of said signals.

28. The invention as set forth in claim 27 including a comparator having storage for counts corresponding to said signals, means for applying the output of said counter to said comparator when said output corresponding to said high reference signals is produced whereby to obtain an error signal, and means responsive to said error signal for varying the frequency of said injection signal.

* * * * *